July 26, 1927.
H. J. MURPHY
1,637,326
PRESSURE LUBRICATING SYSTEM AND APPARATUS
Filed Feb. 1, 1923
2 Sheets-Sheet 1
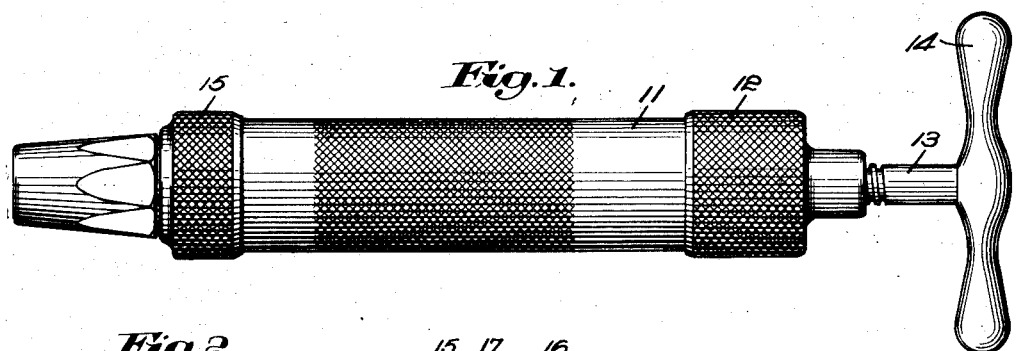
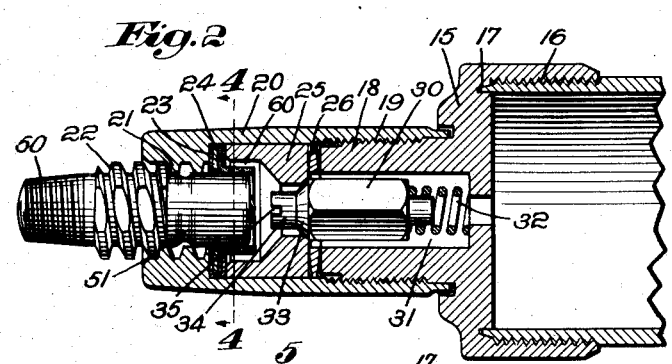 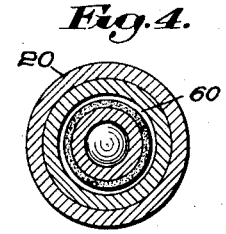
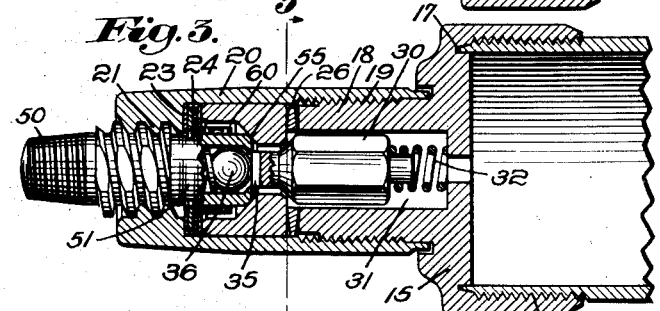 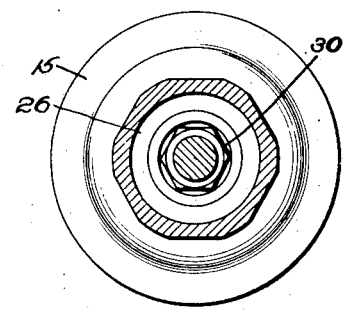
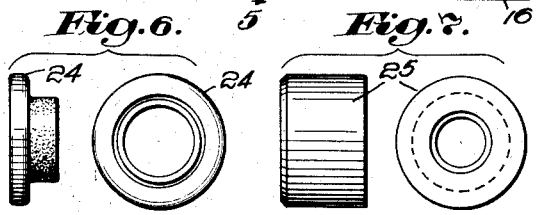 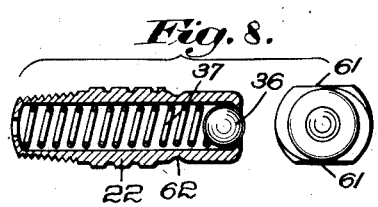
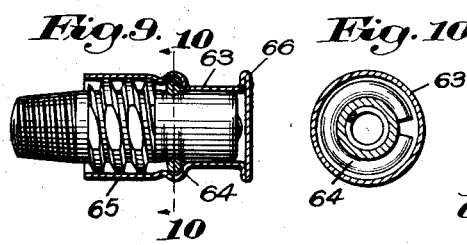
Inventor:
Howard J. Murphy.
Attys July 26, 1927.
H. J. MURPHY
1,637,326
PRESSURE LUBRICATING SYSTEM AND APPARATUS
Filed Feb. 1, 1923  2 Sheets-Sheet 2
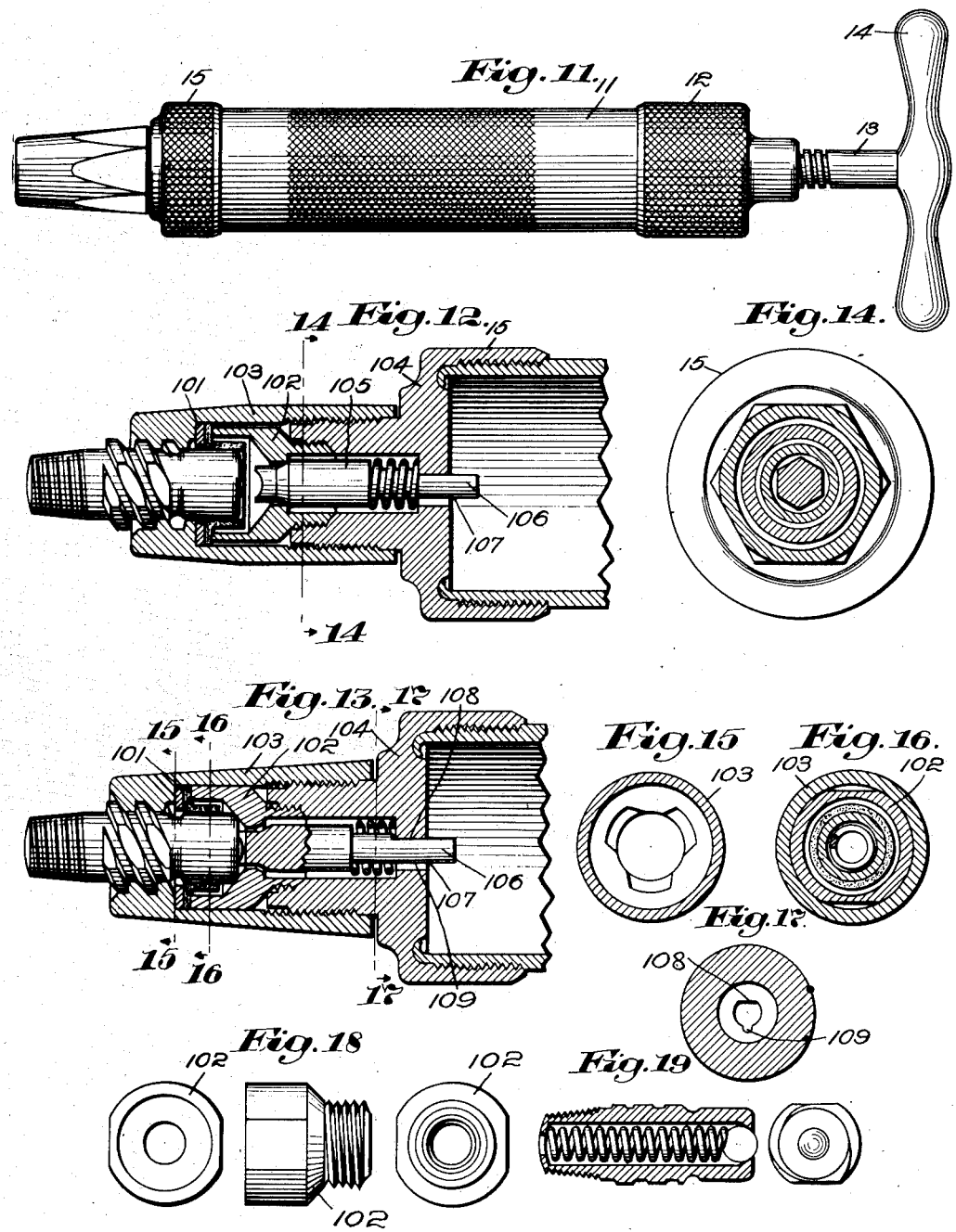

Patented July 26, 1927.

1,637,326

UNITED STATES PATENT OFFICE.

HOWARD J. MURPHY, OF READING, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

PRESSURE LUBRICATING SYSTEM AND APPARATUS.

Application filed February 1, 1923. Serial No. 616,302.

This invention pertains to improvements in pressure lubricating systems and apparatus of the type wherein a single lubricant expelling element is adapted successively to engage a plurality of lubricant-receiving nipples. It is among the objects of the invention to provide a pressure lubricating system simple in construction and efficient in operation.

In the drawings, which show preferred forms of my invention:

Figure 1 is a side elevation of a lubricant-expelling gun;

Fig. 2 is a central, longitudinal section through the nozzle of the gun shown in Fig. 1, with the lubricant-receiving nipple partially engaged in said nozzle, being partly in elevation;

Fig. 3 is a view similar to Fig. 2, but showing the lubricant-receiving element fully entered in the nozzle and with the valve in the nozzle opened to permit discharge of lubricant;

Fig. 4 is a section on the line 4—4 of Fig. 2;

Fig. 5 is a section on the line 5—5 of Fig. 3;

Fig. 6 includes side and end elevations of the preferred form of sealing washer to prevent leakage of lubricant between the nozzle and nipple, while lubricant is supplied to the latter under pressure;

Fig. 7 includes a side and end elevation of a part of the nozzle, providing a valve seat, an abutment for engagement by the head of the nipple and a part for holding the sealing washer in position;

Fig. 8 includes a longitudinal section through a preferred form of nipple and an end elevation thereof;

Fig. 9 is a side elevation of the nipple showing a section of the preferred form of protecting cap therefor;

Fig. 10 is a section on the line 10—10 of Fig. 9, being partly in elevation;

Figs. 11 through 19 illustrate a later development of my invention wherein:

Fig. 11 is a side elevation of a lubricant-expelling gun;

Fig. 12 is a central, longitudinal section through the nozzle of the gun shown in Fig. 11, with the lubricant-receiving nipple partially engaged in said nozzle, being partly in elevation, showing a triple thread on the nipple, and a valve and valve seat held in assembled relation independently of the nozzle sleeve;

Fig. 13 is a view similar to Fig. 12, but showing the lubricant-receiving nipple fully entered in the nozzle and with the valve in the nozzle opened to permit discharge of lubricant;

Fig. 14 is a section on the line 14—14 of Fig. 12;

Fig. 15 is a section on the line 15—15 of Fig. 13;

Fig. 16 is a section on the line 16—16 of Fig. 13;

Fig. 17 is a section on the line 17—17 of Fig. 13, the valve and spring omitted;

Fig. 18 includes a side and two end elevations of a part of the nozzle, providing a valve seat, an abutment for engagement by the head of the nipple, a part for holding the sealing washer in position, and adapted to hold the valve in assembled relation independently of the nozzle sleeve; and Fig. 19 includes a section and an end elevation of a triple thread nipple.

In both forms of my invention illustrated, I have shown lubricant-receiving nipples presenting plural threads for engagement with cooperating threads on the nozzle of a lubricant expelling gun, the thread shown in the first embodiment of my invention being double. In the later embodiment, such thread is triple, to provide for coupling with less turning of the gun, to provide easier initial engagement of the threads and to provide, under high pressure in the gun, for the initiation of uncoupling movement and closure of the valve, by pressure of the lubricant in the barrel when torque is not applied, and this quite independently of any manual turning of the gun in uncoupling direction.

In both embodiments of my invention, I have provided the nipple at the lubricant-securing end with a generally cylindrical projection sufficient to support the gun, when the threads of the nozzle are passed over the projection, and to prevent possible mutilation of the threads of either the nipple or nozzle. The nipple structure is not claimed herein but forms the subject matter of my divisional application Serial No. 8,586, filed February 11, 1925.

Cooperating with each embodiment of my invention, I have shown above the nipple-engaging threads in the nozzle, an aligning portion for engagement with the end of the cylindrical portion on the nipple prior to engagement of the cooperating male and female threads, thereby to oppose cross-threading or other injurious engagement of such threads. I prefer, as shown, that this aligning portion be a washer immediately above the female threads in the end of the nozzle and immediately below a sealing part of the "hat washer" type, such sealing part adapted to surround the cylindrical portion of the cooperating nipple and to be pressed thereagainst by the pressure of the lubricant. In both embodiments of my invention illustrated, this "hat washer" is held in position by being pressed against an overlying annular end by pressure produced by screwing on the nozzle sleeve which carries or provides the female threaded portion of the coupling.

While for some purposes the valve need not be removable except from the interior of the head of the gun, I prefer that it be removable independently of the head of the gun and to this end I have shown in both embodiments of my invention illustrated a valve seat which holds the valve assembled and which is removable from the front of the head of the gun. This valve seat may provide the annular end holding the "hat washer" in position, and also may conveniently provide an abutment to limit the entrance of the nipple within the nozzle, which may in some degree act as a seal against the end of the nipple, though I prefer to avoid the use of any yielding gasket at this point and rely primarily on the "hat washer" to prevent leakage.

I will now describe in detail the form of my invention shown in Figures 1 through 10 of the drawings.

Referring to Fig. 1 through 10 of the drawings, and to the first form of my invention selected for illustrative purposes, I have shown a lubricant expelling gun including a barrel 11, rear head 12, into which is threaded a plunger stem 13 carrying the usual plunger interiorly of the barrel 11, and a handle 14. At the discharge end of the gun, I have shown a front head 15 secured to threads 16 to the exterior of the barrel 11 and presenting a recess 17 into which is introduced a sharpened end edge of the barrel 11 to provide a tight seal between the head 15 and the barrel 11. The preferred form of front head herein illustrated includes a forwardly projecting portion 18 exteriorly threaded at 19 to engage with internal threads on a nozzle sleeve 20. The nozzle sleeve 20 carries, preferably integral therewith, female threads 21, preferably of steep pitch and herein shown as double, to engage corresponding male threads 22 on the lubricant-receiving nipple.

Between the projection 18 of the front head 15 and the threaded portion of nozzle sleeve 20, I have shown a shoulder 23 on the nozzle sleeve which engages and holds in position an aligning part, hereinafter more fully described, a sealing washer 24, a valve seat portion 25 and a sealing disc 26. The front head 15 is cored to receive a valve 30 having a polygonal portion whose corners engage the rounded inner wall of the valve guide chamber 31, the valve being pressed forwardly toward its seat by a valve spring 32 bearing at one end against the front head and at the other against the valve. The seating portion 33 of the valve is shown in Fig. 2 as bearing against the valve seat on the part 25, while in Fig. 3 these parts are separated to permit passage of lubricant. The valve opening end 34 may be slotted at 35 to permit passage of the lubricant to the lubricant-receiving opening in the end of the lubricant-receiving nipple. Such lubricant-receiving opening is preferably ordinarily closed by a ball check 36, which may be opened by the pressure of the lubricant, being normally pressed toward its seat by a nipple spring 37.

Assuming the parts carried by the front head 15 to be disassembled, the method of assembling the first embodiment of my invention illustrated is as follows. The valve part 30 with the valve spring 32 assembled therewith is dropped into the valve guide chamber 31. The aligning part, the sealing washer 24, the valve seat part 25 and sealing disc 26 may then be dropped in the order named within the nozzle sleeve 20, and the nozzle sleeve 20 screwed onto the projecting end 18 of the front head. When the screwing together of these parts is completed, the assembling operation is completed. Assuming the barrel 11 to be filled with lubricant, and assuming the lubricant-receiving nipple to be secured to its carrying part on the apparatus to be lubricated as by screwing the threaded end 50 thereof into a correspondingly threaded aperture, the lubricant expelling gun may be grasped by the handle 14 and the nozzle thereof introduced over the smooth end 51 of the lubricant-receiving nipple, which, contacting with the inner surface of the female threads in the nozzle, will guide the nozzle until the end of the nipple enters the aligning part, herein shown as a washer. This aligning part has an aperture fitting the exterior of the smooth end of the nipple sufficiently closely normally to preclude cross-threading of the male threads on the nipple with the female threads on the nozzle. The relatively steep pitch threads, double in the first embodiment of my invention, are very strong and render engagement easy and rapid, though the triple threads shown in the second embodiment of my invention are superior not only in these respects but in other respects hereinafter referred to. Where the barrel of the gun rigidly carries the nozzle, the end 51 of the nipple and the threads of the nozzle are sufficient to carry the weight of the gun, though full of lubricant, and where sufficient entrance of the nipple is effected to provide entrance of the head thereof within the aligning part, sufficient bearing is provided not only to hold this weight but to provide substantial alignment even though the tendency to bind is increased by transverse pressure of the operator's hand on the end of the barrel or handle, in a position providing of course a leverage very unfavorable to alignment of the parts.

If now, the handle 14 be turned in clockwise direction, the whole lubricant expelling gun will be turned in clockwise direction so that the female threads 21 on the nozzle will engage the male threads 22 on the nipple and draw the nozzle over the nipple, forcing the smooth portion 51 of the nipple through the flexible sealing washer 24, the latter being of the type generally known as a "hat washer". When this screwing together operation has been carried to a sufficient point, the projection 34 on the valve in the nozzle will abut against the lubricant-receiving end of the nipple and the valve will be opened, as shown in Fig. 3, until the end of the nipple abuts against the stop shoulder 55. The valve now being opened, further clockwise movement of the handle of the gun will force lubricant past the valve, thereby opening the ball check 36 and permitting passage of lubricant to the part to be lubricated.

The lubricant expelled may, if desired, be under great pressure, but no substantial leakage between the nipple 51 and the nozzle is possible because pressure on the exterior of the hat washer holds the latter in such close contact to the smooth cylindrical portion of the nipple as to preclude leakage. No leakage past the threads 19 takes place because the sealing washer 26, which is preferably of relatively soft metal such as brass, precludes such leakage. In the first embodiment of my invention, all parts of the nozzle except the sealing washer 26 are preferably of steel and the nozzle sleeve 20 and valve seat part 25 are preferably case hardened.

When the lubricant expelling gun is to be removed from the nipple, turning of the handle 14 in counterclockwise direction will withdraw the nozzle from over the nipple, gradually permitting closure of the valve. The valve reaches its seat before the hat washer 24 is clear of the cylindrical portion 51 of the nipple and all pressure on the nipple is relieved by enlargement of the chamber between the head of the nipple and valve before there is any opportunity afforded for leakage. I preferably provide a relatively large aperture 60 behind the hat leather 24, not only to admit pressure behind the leather to insure a tight seal, but also, where a relatively light lubricant such as oil is used as distinguished from grease, to catch surplus oil passing through the valve during the instant when valve-closing operation is taking place.

That portion of the nipple presenting the steep pitch threads 22 is preferably provided with flattened portions 61, 61 to admit of the application of a suitable wrench to screw the nipple into its carrying part. The nipple is also preferably provided with a neck 62 for engagement by suitable means associated with a dust-excluding cap 63, which may be formed of a single sheet of metal, as shown in Fig. 9, enclosing a resilient ring-like spring 64 for engagement in said neck 62 when the cap is fully applied to the nipple. The skirt portion 65 protects the threads of the nipple from dust and mud, while an enlarged head 66 provides a finger hold permitting easy removal.

In the later embodiment of my invention shown in Figs. 11 through 19, the operation of the parts is generally the same as in the first embodiment thereof. There are, however, substantial advantages. The triple thread provides easier engagement than the double thread, and the steeper pitch reduces the turning necessary to effect coupling and opening of the valve, while also providing (at higher pressures) automatic initiation of uncoupling movement (when torque is removed) to the point where the valve has closed, this arising from the pressure of the lubricant on the valve pressing the nozzle away from the nipple with sufficient force to overcome the friction on the threads between the nozzle and nipple. The aligning or centering portion 101 is the same as in the earlier figures, and provides a seat for a similar "hat washer". The valve seat 102 and parts associated therewith are held in position independently of the nozzle sleeve 103, being screwed to the front head 104, which it is obvious may if desired be integral with the barrel of the gun. Thus the hat leather may, if desired, be replaced without disturbing the valve parts. The valve 105 differs from the one earlier described in that means are provided to preclude turning thereof on its seat, such means preferably including a rearwardly extending non-circular portion 106, herein shown as flattened on one side 107 to engage a flattened side 108 (Fig. 17) of a guiding hole in the head 104, while the grease may pass to the valve proper through suitable aperture typified by the lateral groove 109. With this construction, the valve and valve seat may be assembled with the front head and a very superior fit provided merely by pounding lightly on the rear end of the stem 106. This seat, once provided, will be tight so long as the valve seat 102 is not subsequently turned, and there is normally no occasion for subsequently turning this.

While I have shown and described specific embodiments of my invention, it will be understood that considerable changes may be made without departing from the scope thereof, which is best defined in the following claims.

I claim:

1. In lubricating apparatus of the class described, a lubricant-expelling device for co-operation with a lubricant-receiving nipple, said device including a barrel having a front head and a coupling nozzle rigidly connected to said head, said nozzle comprising a female threaded portion for quick detachable connection with said nipple, sealing means for effecting a lubricant-tight connection with said nipple, a valve, and a seat for said valve all located forwardly of and detachably secured to said front head independently of said female threaded portion.

2. A lubricant-expelling device for co-operation with a lubricant-receiving nipple, said device including a barrel, a nozzle non-rotatably secured thereto, said nozzle presenting a nozzle sleeve interiorly threaded at one end for engagement with the nipple, and containing a hat washer, a fixed stop element to limit entrance of the nipple in the nozzle, said stop element having one end thereof seated against the base of said hat washer to hold it in place and presenting at the other end a valve seat.

3. A lubricating device presenting a nozzle having a sleeve and female threads integral with said sleeve for engagement with male threads on a lubricant-receiving part, a removable centering part beyond said female threads for guiding said nozzle relative to the nipple and a removable valve seat part seated against said centering part and presenting an angled shoulder for engagement with the end of the nipple.

4. A lubricating device presenting a nozzle having a sleeve, female threads adjacent the end of said sleeve and a shoulder above said female threads, said shoulder supporting a removable centering part.

5. A lubricating device presenting a nozzle having a sleeve, female threads adjacent the ends of said sleeve and a shoulder above said female threads, said shoulder supporting a removable centering part and beyond said part a hat washer back-supported by said centering part to prevent lubricant from forcing said washer into said female threads.

6. Lubricating apparatus including a nozzle sleeve having interlocking means for making a quick detachable connection with a lubricant receiving fitting, a nozzle sleeve carrying part, and a valve seat presenting part between said sleeve and sleeve carrying part, and a sealing washer held in position by said valve seat presenting part.

7. Lubricating apparatus including a nozzle sleeve, a nozzle sleeve carrying part, a valve seat presenting part between said sleeve and sleeve carrying part and a removable centering part held in position in said sleeve by said valve seat-presenting part.

8. Lubricating apparatus including a nozzle sleeve, a nozzle sleeve carrying part, a valve seat presenting part between said sleeve and sleeve carrying part, a removable centering part and a hat washer both held in position by said sleeve against said valve seat presenting part.

9. Lubricating apparatus including a barrel having a closure at its discharge end, a nozzle secured to said closure and presenting threads interiorly of its end for engagement with an exteriorly threaded lubricant-receiving element, a chamber in said nozzle above said threads and a centering washer secured in said chamber adjacent the inner ends of said threads to engage an extension on the nipple and preclude excessive angularity between the nipple and nozzle during initial coming together of the cooperating threads.

10. A lubricating device presenting a threaded coupling for engagement with a threaded lubricant-receiving nipple, said coupling presenting a nipple centering portion above the threads in the coupling, the threads being of steep pitch and plural for quick connection between the device and the nipple.

11. In apparatus of the class described, a lubricating device presenting a coupling having a threaded part for engagement with a threaded lubricant-receiving nipple, said threads being rugged and of steep pitch for quick connection between the device and the nipple, sealing means adjacent the threaded part for effecting a lubricant-tight connection with said nipple, and means between said sealing means and said threaded part for centering a nipple relatively to said threaded coupling and for preventing said sealing means from projecting into the threaded part of the coupling.

12. Lubricating apparatus presenting a sleeve having integral means for making a quick detachable connection with a lubricant receiving fitting, a support therefor, a valve guided in said support, and a valve seat, said valve seat threadedly connected to the front of said support and holding said valve in assembled relation even after removal of said sleeve.

13. Lubricating apparatus including a threaded nipple and a cooperating coupling presenting a cooperating threaded part for engagement with the threads on said nipple, said nipple having at its lubricant-receiving end an extension of substantial length and of a diameter substantially that of the bottom of its threads, and a centering part in said nozzle beyond said threads, said centering part supporting the base flange of a hat washer adapted to surround and closely bear against said extension.

14. Lubricating apparatus including a lubricant-expelling device comprising a barrel, a lubricant-expelling plunger in said barrel, a nozzle rigidly connected to said barrel, said nozzle presenting coupling means cooperating with coupling means presented by a lubricant-receiving nipple to secure the device to the nipple, a removable centering part and a hat washer beyond said coupling means in said nozzle for peripheral engagement with the end of the nipple, and a fixed abutment a substantial distance beyond said coupling means in said nozzle for engagement with the end of the nipple beyond said hat washer.

15. Lubricating apparatus including a nozzle having a sleeve presenting a plurality of female threads at one end thereof, a hat washer beyond said threads, and a valve within said sleeve beyond said hat washer, said valve including a valve seat part separate from said sleeve to permit removal of said washer from the back end of said sleeve.

16. Lubricating apparatus including a nozzle having a sleeve presenting a plurality of female threads at one end thereof, a hat washer beyond said threads, a valve within said sleeve beyond said hat washer, said valve including a valve seat part separate from said sleeve to permit removal of said washer from the back end of said sleeve, and a relatively thin metal washer between said threads and said hat washer to prevent lubricant from forcing the hat washer into said female threads.

17. A lubricant-expelling device including a supply barrel presenting a valve seat part secured thereto to hold a valve in assembled relation, a sleeve secured to said barrel and presenting a female thread adjacent the outer end thereof, a hat washer having its base held between a metal centering washer and the end of said valve seat part, and said centering washer back-supporting said hat washer adjacent the inner end of said female thread.

18. A lubricant-expelling device having a head at its discharge end, said head carrying a sleeve presenting at its outer end female threads for engagement with corresponding male threads on a lubricant-receiving nipple, said sleeve presenting a chamber between said female threads and said head, and in said chamber a valve seat-providing part removable when said sleeve is disconnected from said head.

19. A lubricant-expelling device having a head at its discharge end, said head carrying a sleeve presenting at its outer end female threads for engagement with corresponding male threads on a lubricant-receiving nipple, said sleeve presenting a chamber between said female threads and said head, and in said chamber a valve seat-providing part, and a hat washer having its base flange pressed toward said valve seat part by said sleeve and having its tubular portion extending within said valve seat part.

20. A lubricant-expelling device having a head at its discharge end, said head carrying a sleeve presenting at its outer end female threads for engagement with corresponding male threads on a lubricant-receiving nipple, said sleeve presenting a chamber between said female threads and said head, and in said chamber a shoulder behind said female threads, a hat washer, valve seat-providing means interiorly chambered to receive the tubular portion of said hat washer, and presenting a tubular shell projecting toward said shoulder to press the base of said hat washer toward said shoulder when said sleeve is assembled with said head.

21. A lubricant-expelling device having a head at its discharge end, said head carrying a sleeve presenting at its outer end female threads for engagement with corresponding male threads on a lubricant-receiving nipple, said sleeve presenting a chamber between said female threads and said head, and in said chamber a shoulder behind said female threads, an apertured disc supported by said shoulder, a hat washer having a base flange supported by said disc, and a tubular part adapted to press said base flange against said disc when said sleeve is assembled with said head, said hat washer having a tubular portion extending within said tubular part.

22. Lubricating apparatus presenting a nozzle including a sleeve having interlocking means for making a quick detachable connection with a lubricant receiving fitting removably secured to the front head of a lubricant expelling device, a valve guided within said head, a seat for said valve independent of said nozzle sleeve, said nozzle sleeve being removably secured to said front head and adapted to clamp said seat thereto, said valve and said seat being removable from the front of said head subsequent to the removal of said sleeve therefrom.

23. In a lubricating apparatus of the class described, the combination of a lubricant compressor, a nozzle connected thereto, said nozzle having a bore formed near its outer end with an annular inwardly facing shoulder and with quick detachable means for engaging a nipple, said bore having therein a sleeve provided with an annular forwardly facing shoulder, a sealing member for engagement with the side walls of said nipple and formed with a peripheral portion operatively held between said shoulders, said sleeve provided with a second forwardly facing annular shoulder for limiting the inward extent of projection of said nipple into said bore.

24. In a lubricating apparatus of the class described, the combination of a lubricant compressor, a nozzle connected thereto, said nozzle provided with a lubricant conducting bore having near its extremity means for making a quick-detachable connection with a lubricant receiving nipple and formed at an intermediate portion thereof with an annular tapered shoulder forming a stop limiting the inward extent of projection of said nipple into said bore, and sealing means for engaging the side walls of said nipple situated between said quick-detachable means and said annular shoulder.

In testimony whereof, I have signed my name to this specification.

HOWARD J. MURPHY.